(12) United States Patent
Reed (10) Patent No.: US 9,349,153 B2
(45) Date of Patent: May 24, 2016

(54) CORRECTING IMAGE CAPTURE DISTORTION

(75) Inventor: Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 733 days.

(21) Appl. No.: 12/109,573

(22) Filed: Apr. 25, 2008

(65) Prior Publication Data

US 2008/0298632 A1    Dec. 4, 2008

Related U.S. Application Data

(60) Provisional application No. 60/913,987, filed on Apr. 25, 2007.

(51) Int. Cl.
| | | |
|---|---|---|
| G06K 9/40 | (2006.01) | |
| G06T 1/00 | (2006.01) | |
| G06T 5/00 | (2006.01) | |

(52) U.S. Cl.
CPC ............. *G06T 1/0064* (2013.01); *G06T 5/003* (2013.01); *G06T 5/002* (2013.01); *G06T 5/006* (2013.01)

(58) Field of Classification Search
CPC ....... G06T 1/0064; G06T 5/002; G06T 5/003; G06T 5/006
USPC .................. 382/100, 255, 275; 348/354–356
See application file for complete search history.

(56) References Cited

U.S. PATENT DOCUMENTS

| | | | |
|---|---|---|---|
| 5,313,280 A | * | 5/1994 | Straus .......................... 348/181 |
| 5,862,260 A | | 1/1999 | Rhoads |
| 5,978,773 A | | 11/1999 | Hudetz |
| 6,108,434 A | | 8/2000 | Cox |
| 6,266,419 B1 | | 7/2001 | Lacy et al. |
| 6,295,373 B1 | * | 9/2001 | Mahalanobis et al. ........ 382/210 |
| 6,307,949 B1 | | 10/2001 | Rhoads |
| 6,332,194 B1 | | 12/2001 | Bloom et al. |

(Continued)

FOREIGN PATENT DOCUMENTS

| | | |
|---|---|---|
| WO | WO0215586 | 2/2002 |
| WO | WO02089056 | 11/2002 |

OTHER PUBLICATIONS

M. Cannon ("Blind deconvolution of spatially invariant image blurs with phase," IEEE Transactions on Acoustics, Speech and Signal Processing, vol. 24, No. 1, Feb. 1976, pp. 58-63).*

(Continued)

*Primary Examiner* — Yubin Hung
(74) *Attorney, Agent, or Firm* — Digimarc Corporation (57) ABSTRACT

The disclosure relates generally to improving readability of machine-readable information, despite signal capture distortion. One claim recites a method comprising: obtaining input data, the input data representing imagery or video, the input data comprising test data and a machine-readable signal; determining characteristics associated with the test data to determine information regarding signal capture distortion of the input data; based on at least the characteristics, determining an amount of correction or counteracting to be applied to the input data; using a programmed processor, applying a determined amount of correction or counteracting to the input data; and analyzing corrected or counteracted input data to obtain the machine-readable signal. Of course, other claims and combinations are provided as well.

27 Claims, 5 Drawing Sheets

(56) References Cited

U.S. PATENT DOCUMENTS

| | | | |
|---|---|---|---|
| 6,408,082 B1 | 6/2002 | Rhoads et al. | |
| 6,459,818 B1 * | 10/2002 | George | 382/254 |
| 6,522,770 B1 | 2/2003 | Seder et al. | |
| 6,563,935 B1 | 5/2003 | Echizen et al. | |
| 6,571,144 B1 | 5/2003 | Moses et al. | |
| 6,577,744 B1 | 6/2003 | Braudaway | |
| 6,590,996 B1 | 7/2003 | Reed et al. | |
| 6,614,914 B1 | 9/2003 | Rhoads et al. | |
| 6,628,329 B1 * | 9/2003 | Kelly et al. | 348/252 |
| 6,681,028 B2 | 1/2004 | Rodriguez et al. | |
| 6,700,995 B2 | 3/2004 | Reed | |
| 6,721,439 B1 | 4/2004 | Levy et al. | |
| 6,721,459 B1 | 4/2004 | Honsinger | |
| 6,859,192 B1 * | 2/2005 | Ogawa | 345/77 |
| 6,947,571 B1 | 9/2005 | Rhoads et al. | |
| 7,027,614 B2 | 4/2006 | Reed | |
| 7,174,031 B2 | 2/2007 | Rhoads | |
| 7,657,750 B2 | 2/2010 | Haas | |
| 2001/0029580 A1 | 10/2001 | Moskowitz | |
| 2002/0029338 A1 | 3/2002 | Bloom et al. | |
| 2002/0044275 A1 * | 4/2002 | Kitabayashi et al. | 356/124 |
| 2002/0064298 A1 | 5/2002 | Rhoads et al. | |
| 2002/0097892 A1 | 7/2002 | Oami | |
| 2003/0216654 A1 * | 11/2003 | Xu et al. | 600/509 |
| 2004/0003052 A1 * | 1/2004 | Yoda | 709/217 |
| 2004/0105569 A1 * | 6/2004 | Sharma et al. | 382/100 |
| 2005/0089247 A1 * | 4/2005 | Braun et al. | 382/298 |
| 2005/0114667 A1 | 5/2005 | Haas | |
| 2005/0134918 A1 | 6/2005 | Reed | |
| 2005/0271130 A1 * | 12/2005 | Howard | H04B 17/309 375/224 |
| 2006/0002583 A1 | 1/2006 | Reed et al. | |
| 2006/0075244 A1 | 4/2006 | Schumann | |
| 2006/0119710 A1 * | 6/2006 | Ben-Ezra et al. | 348/208.99 |
| 2007/0217651 A1 * | 9/2007 | Ishii | 382/100 |
| 2008/0226152 A1 * | 9/2008 | Dirksen et al. | 382/141 |
| 2009/0086230 A1 | 4/2009 | Reed | |
| 2010/0322467 A1 | 12/2010 | Reed et al. | |

OTHER PUBLICATIONS

Hong et al. ("Measuring the MTF for focal plane arrays using random noise targets," Meas. Sci. Technol. 7 (1996) 1087-1091).*

U.S. Appl. No. 60/913,987, filed Apr. 25, 2007.

J.I. Yellott et al., "Correcting spurious resolution in defocused images," SPIE 6492, pp. 64920O-1-64920O-12 (2007).

* cited by examiner

CORRECTING IMAGE CAPTURE DISTORTION

RELATED APPLICATION DATA

This application claims the benefit of U.S. Patent Application No. 60/913,987, filed Apr. 25, 2007, which is hereby incorporated by reference.

TECHNICAL FIELD

The present disclosure relates generally to data hiding and digital watermarking. In some implementations the present disclosure relates to correcting optical scan or other capture distortion, e.g., such as lens blurring, focus errors and other scanning anomalies.

BACKGROUND AND SUMMARY

Digital watermarking—a form of steganography—is a process for modifying media content to embed a machine-readable code into the content. The content may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including text documents (e.g., through line, word or character shifting, background texturing, etc.), software, multi-dimensional graphics models, and surface textures of objects.

Digital watermarking systems typically have two primary components: an embedding component (or encoder) that embeds a watermark in media content, and a reading component (or detector) that detects and reads the embedded watermark. The embedding component embeds a watermark by altering data samples of the media content in the spatial, temporal or some other domain (e.g., Fourier, Discrete Cosine or Wavelet transform domains). The reading component analyzes target content to detect whether a watermark is present. In applications where the watermark encodes information (e.g., a plural-bit message), the reader extracts this information from the detected watermark.

The present assignee's work in steganography, data hiding and digital watermarking is reflected, e.g., in U.S. Pat. Nos. 5,862,260, 6,408,082, 6,614,914 and 7,027,614, which are each hereby incorporated by reference. A great many other approaches are familiar to those skilled in the art. The artisan is presumed to be familiar with the full range of literature concerning steganography, data hiding and digital watermarking.

In some cases digital watermarking and other machine-readable indicia (e.g., barcodes, data glyphs, etc.) may be detected from optical scan data, examples of which are disclosed in, e.g., U.S. Pat. Nos. 5,978,773, 6,522,770, 6,681,028, 6,947,571 and 7,174,031, which are each hereby incorporated by reference.

Today's camera phones and other handheld readers present expanded decoding opportunities—and challenges.

One challenge is providing handheld cameras (e.g., in a cell phone or other mobile device) to an army of users, with nearly each user having a different idea on proper focal length for image and video capture.

Figure 1:
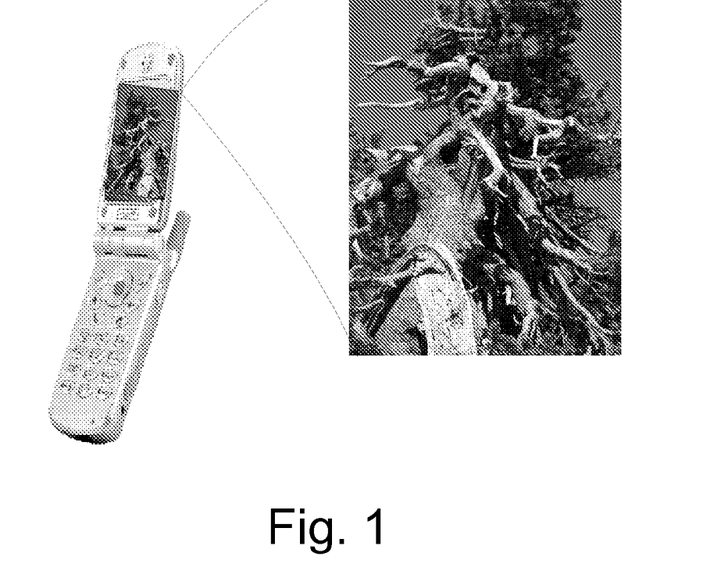
FIG. 1 illustrates image capture with a cell phone including an optical sensor.

In some cases a user may want to be close to a marked image or video to, e.g., capture high spatial frequency content (see FIG. 1); but the close positioning often results in a captured image that is slightly out of focus (or blurred)—which may hamper detection of a machine-readable code contained or represented in the image.

Thus, one inventive combination provides a method including: obtaining input data; altering a digital watermark or a digital watermarking process to pre-distort a digital watermark signal, wherein the altering is intended to counteract or compensate for expected distortion enabling machine-based detection of an embedded, pre-distorted digital watermark signal despite the expected distortion; and embedding the pre-distorted digital watermark signal in the input data.

Another inventive combination provides a method including: obtaining a plurality of different models representing different expected distortion associated with a plurality of different data captures, the different data captures each resulting in distortion of a machine-readable signal; indexing the different models; upon receiving a request, selecting a model associated with the request; and providing the selected model.

Still another inventive combination provides a method including: obtaining input data; altering a digital watermark or a digital watermarking process to pre-distort a digital watermark signal, wherein the altering is intended to counteract or compensate for expected distortion due to image capture or an image capture device, the altering enabling machine-based detection of an embedded, pre-distorted digital watermark signal despite the expected distortion; and embedding the pre-distorted digital watermark signal in the input data.

Yet another inventive combination provides a method including: obtaining input data, the input data representing imagery captured with at least an optical lens, the input data comprising test data and a machine-readable signal; evaluating characteristics associated with the test data to determine information regarding lens blurring of the input data associated with the optical lens; adjusting the input data to compensate for or to correct the lens blurring based at least in part on the information; and analyzing the compensated for or corrected input data to obtain the machine-readable signal.

Another inventive combination includes: obtaining input data, the input data representing imagery or video, the input data comprising test data and a machine-readable signal; determining characteristics associated with the test data to determine information regarding signal capture distortion of the input data; based on at least the characteristics, determining an amount of correction or counteracting to be applied to the input data; applying a determined amount of correction or counteracting to the input data; and analyzing corrected or counteracted input data to obtain the machine-readable signal.

Further combinations, aspects, implementations, features, embodiments and advantages will become even more apparent with reference to the following detailed description, the accompanying drawings and claims.

DETAILED DESCRIPTION

Figure 2A:
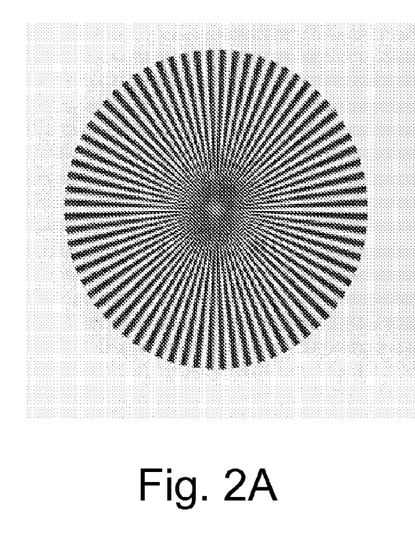
FIG. 2A illustrates an example target image.
Figure 2B:
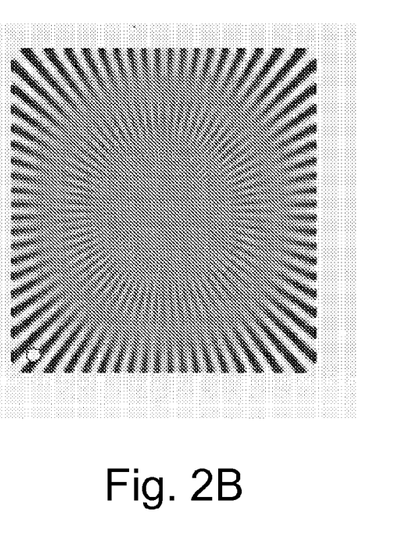
FIG. 2B illustrates examples of adverse effects on focus (e.g., blurring) of the FIG. 2A example target image.

When an image is distorted (e.g., blurred, out of focus, etc.) by an optical capture device (e.g., a cell phone camera, PDA, digital camera, etc.) the loss of information from a target image (FIG. 2A) can be in the form shown in FIG. 2B. For example, in some cases there may be a loss of information in some high spatial frequencies.

The distortion may result in some high spatial frequencies of the target image being "out of phase" or otherwise distorted.

In the case of a target image including or representing machine-readable information, e.g., a barcode, data glyph or digital watermark, some higher spatial frequency information corresponding to at least some of the machine-readable information is also out of phase, making reliable detection of the machine-readable information more difficult.

Figure 3:
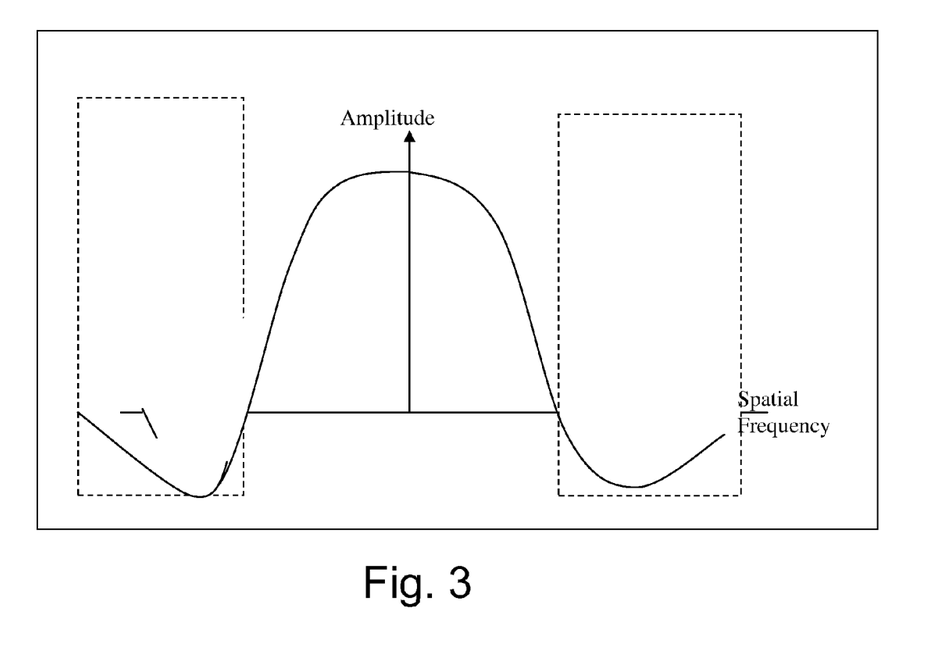
FIG. 3 illustrates a plot diagram.

Distortion such as blurring can be modeled or approximated by a convolution of a target image with, e.g., a Bessel function, as postulated by J. I. Yellott et al., "Correcting spurious resolution in defocused images," SPIE 6492, pp. 64920O-1-64920O-12 (2007), hereby incorporated by reference. FIG. 3 illustrates a portion of a Bessel function, where the negative areas (shown with dotted boxes) correspond to a 90 degree phase shift.

Some examples are now provided illustrating and describing compensation for distortion.

In a first implementation a target image includes a digital watermark signal. But prior to being embedded in the target image, the digital watermark signal is pre-distorted with a phase shift, e.g., shifted 90 degrees relative to expected distortion. For example, if the distortion is likely to occur in high frequency areas such as discussed above with respect to convolving with the function shown in FIG. 3, high frequency components of the digital watermark are shifted 90 degrees. (An appropriate shift can be achieved by, e.g., convolving a digital watermark signal with an appropriate or corresponding Bessel function.) The pre-distorted watermark is then embedded into an image and printed, engraved or otherwise reproduced. Then, when expected distortion occurs (e.g., blurring due to image capture or focus errors), the high frequency watermark components are distorted (e.g., convolved) into a more readable form, enabling better watermark detection.

As another example, if a digital watermark includes signal elements with values corresponding to [+1, 0, −1] at positions in a high frequency area, the signal is preferably phase shifted to compensate for excepted distortion. In the case of distortion modeled by a convolution with a target image and the function shown in FIG. 3, the signal is shifted 90 degrees resulting in signal elements with values corresponding to [−1, 0, +1] at the positions in the high frequency area. When this pre-distorted digital watermark signal is subjected to blurring during image capture, the pre-distorted signal elements are distorted again—but in an expected manner—resulting in signal elements with values corresponding to [+1, 0 −1], which correspond to the original signal elements. (The blurring shifts the signal essentially back to its original, pre-distorted form.)

Figure 4:
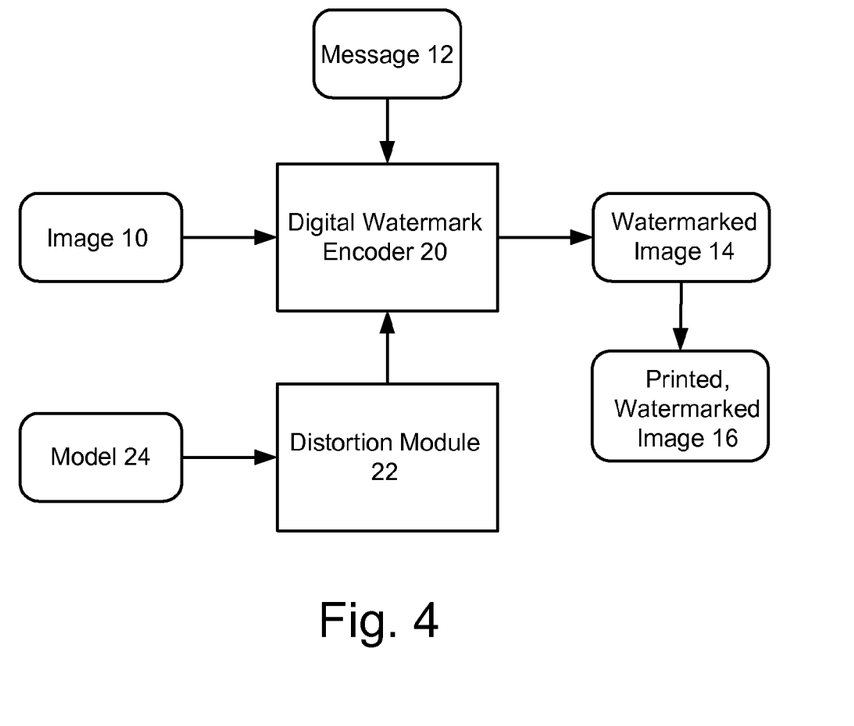
FIG. 4 is a block diagram illustrating an embedding process.

FIG. 4 illustrates a block diagram corresponding to one implementation of pre-distortion.

An image 10 is obtained to be watermarked. The image 10 can be of any form, e.g., a color image, grayscale, a photograph, a graphic or artwork, video representation, etc. If the image 10 is in analog form, e.g., a printed image, it can be optically scanned or captured (e.g., with a digital camera or optical sensor) or otherwise converted into a digital image.

A message 12 is provided (e.g., 1 or more bits). The message 12 is intended to be hidden within the image 10 with digital watermarking or steganography. A digital watermarking signal is generated by a digital watermark encoder 20 to represent or otherwise carry the message 12. The digital watermark signal may be an additive signal, e.g., one that is added (or subtracted, multiplied, etc.) to the image 10, may represent instructions or changes that should be made to the image 10 to carry the message, e.g., based on a key, and/or may include changes or modifications to frequency domain coefficients, and/or may include a random or pseudo-random component. Of course, other digital watermarking techniques may be used as well.

The digital watermark signal is pre-distorted to compensate for expected distortion, e.g., by a distortion module 22. Distortion module 22 may be incorporated into encoder 20 or encoder 20 may other wise communicate or cooperate with a distortion module 22. Distortion module 22 accesses or otherwise determines a distortion model 24. Distortion model 24 provides a template, mask or other instructions to be used by distortion module 22 when pre-distorting the digital watermark signal. The distortion model 24 can be based on or tailored to, e.g., the type of image 10, the watermark message 12, the expected distribution channel through which image 10 will travel, the expected type of image capture, optical lens system or a model of distortion introduced by such, digital watermark encoder 20, human visual system (HVS), etc. In one implementation, the distortion module 22 (or watermark encoder 20) communicates with a database, model library or a network remote resource to access an appropriate model 24. The term "appropriate" in this context implies that a model 24 is selected or obtained to compensate for expected distortion. Of course, the distortion module 22 may be pre-programmed with a default distortion model 24, e.g., based on or tailored to expected distortion that a digital watermark will most likely encounter.

Prior to embedding the digital watermark signal in the image 10, the distortion module 22 accesses a distortion model 24 and pre-distorts a digital watermark signal to counteract or compensate for expected distortion associated with optical scanning or capture. Returning to an example discussed above, e.g., blurring or other distortion that can be modeled with convolving image 10 with a Bessel Function, the digital watermark is phase shifted in some or all higher frequencies, e.g., 90 degrees, to compensate for the expected distortion.

The pre-distorted digital watermark—representing or carrying message 12—is embedded in image 10 to yield a watermarked image 14. The watermarked image 14 can then be printed or otherwise reproduced in an analog form.

A printed (or otherwise fixed) image 16 that includes a pre-distorted digital watermark signal can then be optically scanned or captured—which introduces expected distortion.

But since the digital watermark signal has been pre-distorted, the expected distortion transforms (e.g., modeled as a convolution with a determined function) the pre-distorted digital watermark signal into a more readable form.

Optical data corresponding to the printed (or otherwise fixed), watermarked image 16 is provided to a digital watermark decoder to analyze the scan data and recover the message 12. Of course, the digital watermark decoder may be co-located with an image sensor or otherwise located on a handheld device (e.g., a cell phone or personal digital assistant (PDA)). Still further, the digital watermark decoder may be remotely located from an image capture device.

Post-Capture Correction

In other embodiments, a digital watermark is provided without the pre-distortion discussed above. Correction for lens blur is applied after image capture. These post-capture correction embodiments may allow for an even more imperceptible watermark, relative to a pre-distortion watermark.

While post-capture creation may include some post-processing, it may be more flexible relative to the pre-distortion methods and systems discussed above, as many types or amounts of capture distortion can be corrected.

A digital watermark is embedded in a host signal (e.g., an image or video). The embedded host signal is provided onto a surface (projected or rendered if video) or object (e.g., printed, engraved, etc.) and then an optical scan or digital image is captured of the surface or object.

Recall, here, the digital watermark has not been pre-distorted as discussed above with respect to FIG. 4. So prior to watermark detection (or as an initial stage of the watermark detection) the captured image data is filtered or corrected. The filter adjusts the captured image data to compensate for the capture distortion (e.g., lens blur).

To determine an amount or level of compensation or correction, one process quantifies or otherwise evaluates image blur in the image or video data. Such an evaluation or quantification helps to determine an appropriate amount of correction to be applied to captured image and video.

In one example, test data can be introduced into an image or video. Characteristics associated with the test data can be evaluated in captured imagery to help determine an amount or level of lens blur.

One example of test data is white noise (or other type of noise, e.g., a pseudo-random pattern, noise in some predetermined frequencies, etc.), which can be added to an image or video, e.g., as a part of or before/after digital watermark embedding. The white noise is preferably imperceptible in the image or video, but of course, there may be some applications where some perceptibility is allowed. After image or video capture, the white noise can be evaluated, e.g., in a spatial frequency domain as shown in FIGS. 8A and 8B.

Figure 8A:
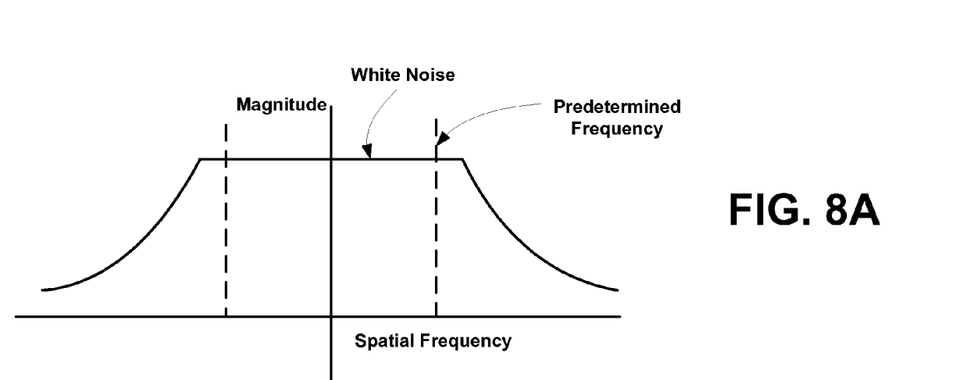
FIG. 8A is a diagram showing test data in a spatial frequency domain (with acceptable lens blur)

FIG. 8A illustrates a spatial frequency response for captured imagery with acceptable capture distortion. The term "acceptable" can be quantified by determining white noise signal magnitude at a predetermined spatial frequency or range of frequencies. If the signal magnitude is at or above a predetermined magnitude for the predetermined spatial frequency (or range of frequencies) the capture distortion can be deemed acceptable.

Figure 8B:
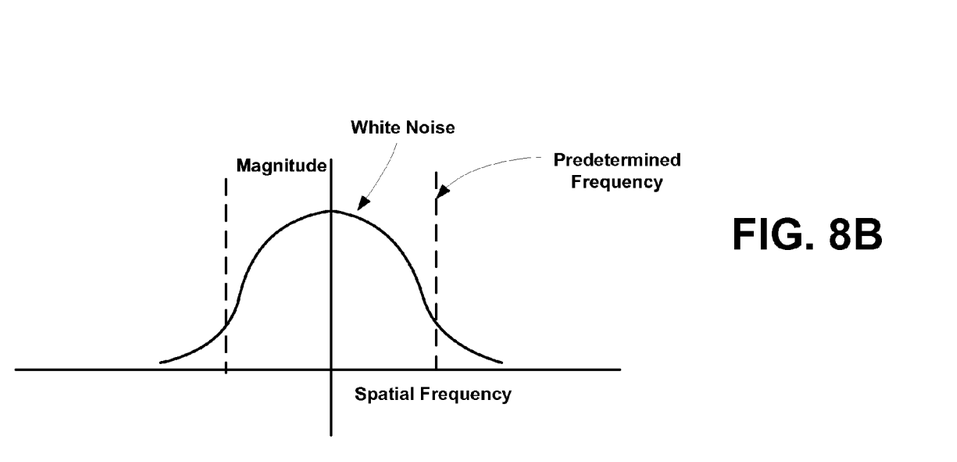
FIG. 8B is another diagram showing test data in a spatial frequency domain (with unacceptable lens blur).

FIG. 8B illustrates a spatial frequency response for captured imagery with unacceptable capture distortion. The term "unacceptable" can be quantified by determining white noise signal magnitude at a predetermined spatial frequency or range of frequencies. If the signal magnitude is below a predetermined magnitude for the predetermined spatial frequency (or range of frequencies) the capture distortion can be deemed unacceptable.

The signal magnitude level can also be used to help determine or estimate an amount or level of correction or adjustment that is needed as well. For example, if the magnitude is below (or between) a first pre-determined amount, a first level is determined; and if the magnitude is below (or between) a second pre-determined amount, a second level is determined. An amount or level of correction or adjustment corresponding to the first pre-determined amount or the second pre-determined amount is then selected.

Another example of test data are predetermined structures. For example, a dark spot surrounded by a lighter (e.g., white) color is provided in the spatial domain in an image or video. The dark spot and surrounding lighter color are preferably subtle so as not to detract from the image or video. A spatial frequency plot of captured imagery including such test data is useful in evaluating capture distortion such as lens blur. The dot structure is approximated by a delta function in a spatial frequency domain. The magnitude and frequency location of the delta function can be used to determine an amount, type or level of capture distortion. Appropriate correction can be determined and applied to captured imagery if needed.

Once an estimate of the lens blur is determined, it can be used to help correct capture distortion in captured imagery. For example, the estimate may be mapped against pre-determined levels of lens blurring, e.g., stored in a data structure associated with or cooperating with a digital watermark detector. In one implementation, estimated distortion is used to determine a level, type or degree of lens blurring or other distortion. A corresponding scale factor or other corresponding modification can then be obtained, e.g., from a data structure. An obtained scale factor or other modification can then be applied to a master correction template or filter.

Figure 5:
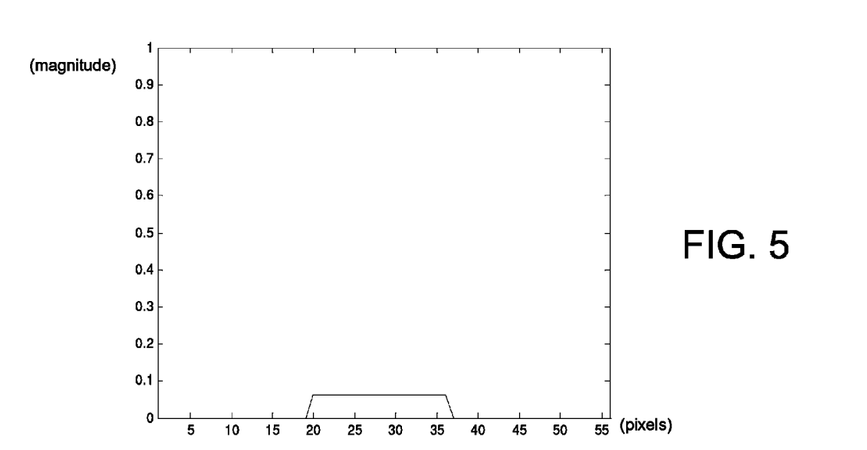
FIG. 5 is a diagram showing an approximation or estimate of lens blurring.
Figure 6:
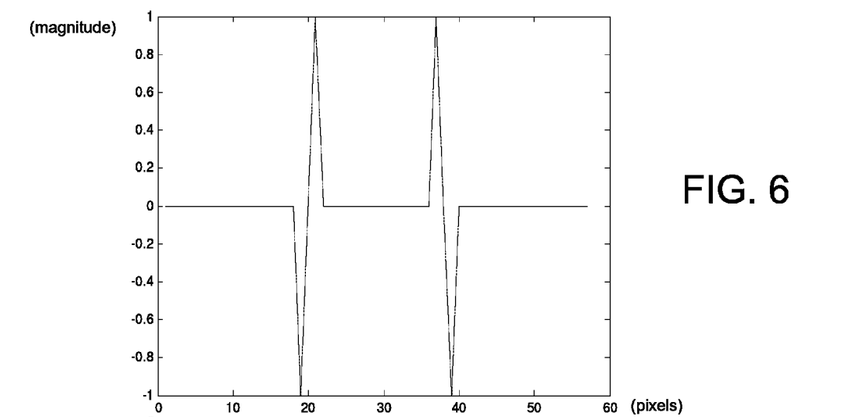
FIG. 6 is a correction template or filter to compensate for the blurring shown in FIG. 5.
Figure 7:
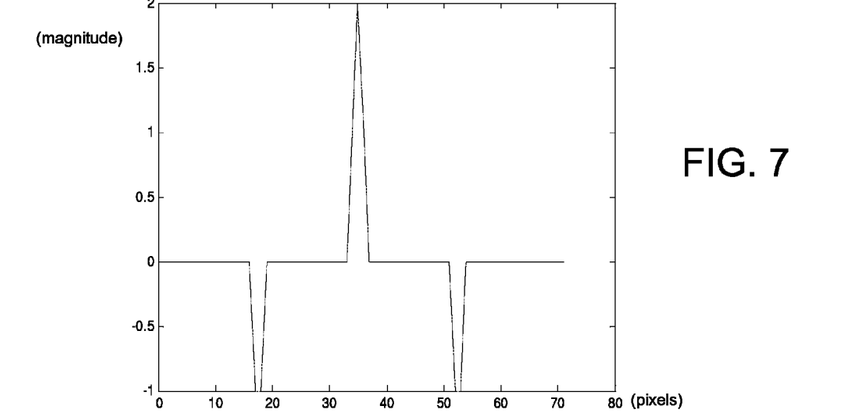
FIG. 7 is a blurred signal (FIG. 5) after compensation by the FIG. 6 correction template or filter.

An approximation of one example lens blur is shown in FIG. 5, where pixel magnitude of the blur is illustrated. The illustrated blur spans more than 15 pixels, which would severely disrupt an image or video in the pixel area. A master correction template or filter is shown in FIG. 6, e.g., for a 1-dimensional signal. (Of course, other types of signals, e.g., 2-dimensional signal can be similarly corrected.) The master correction template or filter is adjusted, scaled or modified by a determined scale factor or other corresponding modification, if needed. The adjusted, scaled or modified template or filter is then applied to the captured imagery to counteract, adjust or correct image blur (FIG. 7). A digital watermark detector (or other machine-readable symbology detector) analyzes the counteracted, adjusted or corrected captured imagery to read or detect a digital watermark (or other machine-readable code).

In another implementation, a correction template or filter is generated upon evaluation of image blur. For example, based on an evaluation of test data in a spatial frequency domain, a correction filter is generated to counteract lens blur. A generated correction template or filter is applied to captured imagery to counteract, adjust or correct image blur. A digital watermark detector (or other machine-readable symbology detector) analyzes the counteracted, adjusted or corrected captured imagery to read or detect a digital watermark (or other machine-readable code).

Figure 9:
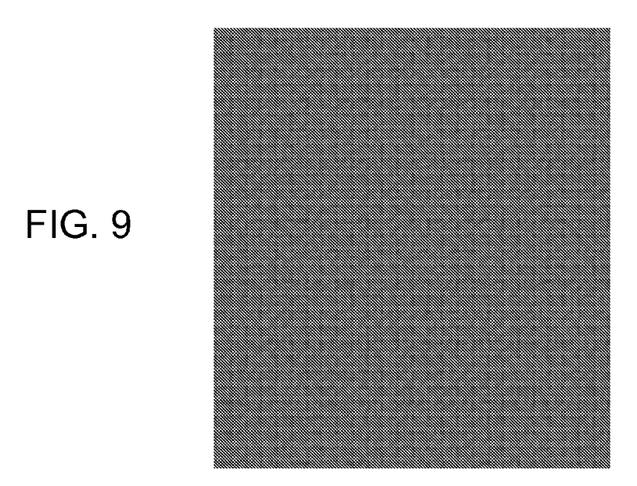
FIG. 9 shows a digital watermarked gray patch.
Figure 10A:
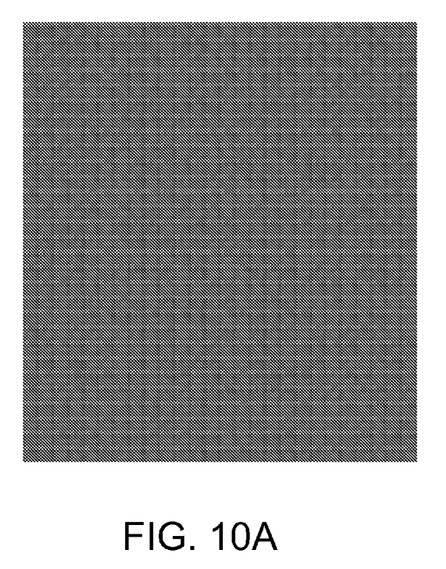
FIG. 10A shows the watermarked gray patch of FIG. 9 after capture distortion (e.g., lens blurring).
Figure 10B:
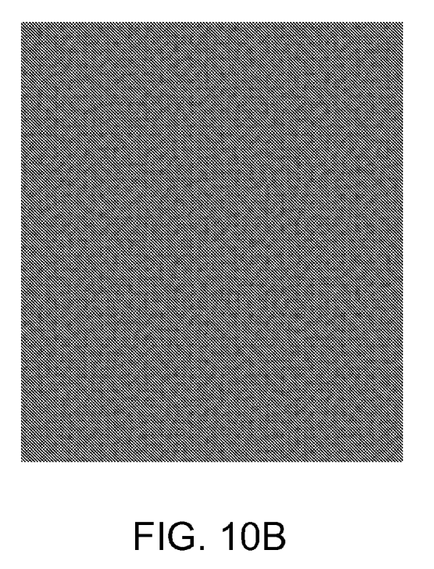
FIG. 10B shows the FIG. 10A patch after compensation or correction (e.g., using the FIG. 6 correction).

To further illustrate some of these processes, an original watermark was created by embedding a Digimarc Mobile digital watermark signal (provided by Digimarc Corporation headquartered in Beaverton, Oreg.) into a gray image patch. The digital watermark signal is readily detectable from the watermarked gray image patch (FIG. 9). Lens blur (e.g., approximated by FIG. 5) is applied to the watermarked gray patch (FIG. 9), resulting in a blurred image patch shown in FIG. 10A. The digital watermark is difficult (and perhaps impossible) to read from the distorted FIG. 10A patch. But, after compensation (e.g., as approximated in FIG. 6) is applied to the distorted FIG. 10A image, e.g., as shown in FIG. 6, the watermark is readily detected from the resulting image shown in FIG. 10B. My tests show that the compensated for gray patch (FIG. 10B) reads about 5 dB better than the FIG. 10A patch and approaches the detection results of a digital watermark embedded in the original gray image patch (FIG. 9).

Concluding Remarks

Having described and illustrated the principles of the technology with reference to specific implementations, it will be recognized that the technology can be implemented in many other, different, forms.

The methods, processes, components, modules, generators and systems described above may be implemented in hardware, software or a combination of hardware and software. For example, digital watermark embedding or decoding processes may be implemented in a programmable computer or a special purpose digital circuit. Similarly, these watermarking processes may be implemented in software, firmware, hardware, or combinations of software, firmware and hardware.

The methods, components and processes described above may be implemented in software programs (e.g., C, C++, Visual Basic, Java, executable binary files, etc.) executed from a system's memory (e.g., a computer readable medium, such as an electronic circuitry and/or an optical or magnetic storage device).

The section headings are provided for the reader's convenience. Features found under one heading can be combined with features found under another heading. Of course, many other combinations are possible given the above detailed and enabling disclosure.

We have used the terms "image" and "imagery" above. Both of these terms should be construed broadly enough to include images or video.

The particular combinations of elements and features in the above-detailed embodiments are exemplary only; the interchanging and substitution of these teachings with other teachings in this and the above-mentioned U.S. patent documents are also contemplated.

What is claimed is:

1. A method comprising:
obtaining input data, the input data representing imagery captured with an optical lens, the input data comprising test data consisting of white noise and a separate machine-readable signal, in which the test data is auxiliary to and imperceptible in the imagery;
evaluating characteristics associated with the test data to determine information regarding blurring of the input data associated with the optical lens or image capture;
using a programmed processor, adjusting the input data to compensate for or to correct the blurring based at least in part on the information;
analyzing the compensated for or corrected input data to obtain the machine-readable signal.

2. The method of claim 1 wherein the machine-readable signal comprises digital watermarking.

3. The method of claim 1 wherein the machine-readable signal is represented with a 2-D symbology.

4. The method of claim 1 wherein said act of evaluating comprises evaluating characteristics of the test data in a spatial frequency domain.

5. The method of claim 1 wherein said act of adjusting comprises scaling or modifying a template or filter which models the blurring, and adjusting the input data with the scaled or modified template or filter.

6. The method of claim 5, further comprising, prior to said act of adjusting, accessing a data structure to obtain the template or filter.

7. A non-transitory machine-readable memory comprising instructions to perform the method recited in claim 1.

8. An apparatus comprising:
electronic memory for storing input data, the input data representing imagery captured with at least an optical lens, the input data comprising test data consisting of white noise and a separate machine-readable signal, in which the test data is auxiliary to and imperceptible in the imagery; and
an electronic processor programmed for:
evaluating characteristics associated with the test data to determine information regarding blurring of the input data associated with the optical lens or image capture;
adjusting the input data to compensate for or to correct the blurring based at least in part on the information;
analyzing the compensated for or corrected input data to obtain the machine-readable signal.

9. The apparatus of claim 8 wherein the machine-readable signal comprises digital watermarking.

10. The apparatus of claim 8 wherein the machine-readable signal is represented with a 2-D symbology.

11. The apparatus of claim 8 wherein the evaluating comprises evaluating characteristics of the test data in a spatial frequency domain.

12. The apparatus of claim 8 wherein the adjusting comprises scaling or modifying a template or filter which models the blurring, and adjusting the input data with the scaled or modified template or filter.

13. The apparatus of claim 11, wherein prior to the adjusting, accessing a data structure to obtain the template or filter.

14. A method comprising:
obtaining input data, the input data representing imagery or video, the input data comprising test data consisting of white noise and a separate machine-readable signal, in which the test data is auxiliary to and imperceptible in the imagery or video;
determining characteristics associated with the test data to determine information regarding signal capture distortion of the input data;
based on at least the characteristics, determining an amount of correction or counteracting to be applied to the input data;
using a programmed processor, applying a determined amount of correction or counteracting to the input data; and
analyzing corrected or counteracted input data to obtain the machine-readable signal.

15. The method of claim 14 wherein said act of determining an amount of correction or counteracting to be applied to the input data compares at least one of the characteristics to pre-determined values.

16. The method of claim 15 wherein the pre-determined values represent different levels, types or amount of signal capture distortion.

17. The method of claim 14 wherein the machine-readable signal comprises digital watermarking.

18. The method of claim 14 wherein the machine-readable signal is represented with a 2-D symbology.

19. The method of claim 14 wherein said act of applying comprises applying a determined amount of correction or counteracting to a template or filter which models capture distortion, with the applied template or filter then being applied to the input data.

20. The method of claim 14 wherein the signal capture distortion comprises at least image blurring associated with optical capture of the input data.

21. An apparatus comprising:
electronic memory for storing input data, the input data representing imagery or video, the input data comprising test data consisting of white noise and a separate machine-readable signal, in which the test data is auxiliary to and imperceptible in the imagery or video; and
an electronic processor programmed for:
determining characteristics associated with the test data to determine information regarding signal capture distortion of the input data;
based on at least the characteristics, determining an amount of correction or counteracting to be applied to the input data;
applying a determined amount of correction or counteracting to the input data; and
analyzing corrected or counteracted input data to obtain the machine-readable signal.

22. The apparatus of claim 21 wherein the determining an amount of correction or counteracting to be applied to the input data compares at least one of the characteristics to pre-determined values.

23. The apparatus of claim 22 wherein the pre-determined values represent different levels, types or amount of signal capture distortion.

24. The apparatus of claim 21 wherein the machine-readable signal comprises digital watermarking.

25. The apparatus of claim 21 wherein the machine-readable signal is represented with a 2-D symbology.

26. The apparatus of claim 21 wherein the applying comprises applying a determined amount of correction or counteracting to a template or filter which models capture distortion, with the applied template or filter then being applied to the input data.

27. The apparatus of claim 21 wherein the signal capture distortion comprises at least image blurring associated with optical capture of the input data.

* * * * *